(12) United States Patent
Rodgers et al.

(10) Patent No.: US 12,064,902 B2
(45) Date of Patent: Aug. 20, 2024

(54) SYSTEM AND METHOD OF FORMING A FIBER PREFORM FOR USE IN MANUFACTURING A COMPONENT MADE OF A COMPOSITE MATERIAL

(71) Applicant: GM GLOBAL TECHNOLOGY OPERATIONS LLC, Detroit, MI (US)

(72) Inventors: William R. Rodgers, Bloomfield Township, MI (US); Terrence Wathen, Sterling Heights, MI (US); Selina Xinyue Zhao, Rochester Hills, MI (US); Venkateshwar R. Aitharaju, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 315 days.

(21) Appl. No.: 17/531,318

(22) Filed: Nov. 19, 2021

(65) Prior Publication Data
US 2023/0158712 A1    May 25, 2023

(51) Int. Cl.
*B29B 11/16* (2006.01)
*B29C 70/22* (2006.01)

(52) U.S. Cl.
CPC .......... *B29B 11/16* (2013.01); *B29C 70/222* (2013.01)

(58) Field of Classification Search
CPC ......... B29B 11/16; B29B 11/00; B29B 11/14; B29C 70/222; B29C 70/22; B29C 70/16; B29C 70/10; B29C 70/06; B29C 70/04; B29C 70/00; D05B 35/00; D05C 3/02; D05C 7/00
See application file for complete search history.

(56) References Cited

U.S. PATENT DOCUMENTS

| | | | | |
|---|---|---|---|---|
| 5,241,919 A | * | 9/1993 | LaGreca | A41D 27/08 2/244 |
| 5,609,119 A | * | 3/1997 | Yeh | D05C 17/00 38/102.2 |
| 5,794,555 A | * | 8/1998 | Kwang | D04C 1/04 112/475.22 |
| 6,051,089 A | * | 4/2000 | Palmer | B29C 66/43461 156/303.1 |
| 6,860,214 B1 | * | 3/2005 | Wang | D05C 15/00 112/475.22 |
| 7,819,462 B1 | | 10/2010 | Owens et al. | |
| 8,033,592 B2 | | 10/2011 | Hsu et al. | |
| 11,111,610 B2 | | 9/2021 | Aitharaju et al. | |
| 2006/0106147 A1 | | 5/2006 | Fasulo et al. | |

(Continued)

FOREIGN PATENT DOCUMENTS

| | | |
|---|---|---|
| DE | 19629044 A1 | 1/1997 |
| DE | 102007032904 B3 | 11/2008 |

(Continued)

OTHER PUBLICATIONS

German Office Action for German Application No. 10 2022 124 197.1 dated Sep. 21, 2023.

*Primary Examiner* — Ismael Izaguirre (57) ABSTRACT

The present application discloses a method of making a preform for use in manufacturing a component made of a composite material. The method includes stitching fibers onto a film to form a fiber bed in a two-dimensional shape, removing the film from the fiber bed, and adjusting the fiber bed into a three-dimensional shape to form the preform.

20 Claims, 8 Drawing Sheets

(56) References Cited

U.S. PATENT DOCUMENTS

| | | |
|---|---|---|
| 2006/0199890 A1 | 9/2006 | Fasulo et al. |
| 2007/0299185 A1 | 12/2007 | Ottaviani et al. |
| 2010/0098925 A1 | 4/2010 | Fasulo et al. |
| 2011/0121225 A1 | 5/2011 | Posudievsky et al. |
| 2013/0015602 A1 | 1/2013 | Bernadet et al. |
| 2021/0229327 A1 | 7/2021 | Aitharaju et al. |

FOREIGN PATENT DOCUMENTS

| | | | |
|---|---|---|---|
| DE | 102015223364 A1 | 6/2017 | |
| EP | 0857806 A1 * | 8/1998 | |
| WO | WO-2021192773 A1 * | 9/2021 | ........... B29C 70/228 |

* cited by examiner

SYSTEM AND METHOD OF FORMING A FIBER PREFORM FOR USE IN MANUFACTURING A COMPONENT MADE OF A COMPOSITE MATERIAL

GOVERNMENT CLAUSE

This invention was made with government support under Grant No. DE-EE0009204 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for forming a fiber preform for use in manufacturing a component made of a composite material.

Composite materials are used for buildings, bridges, and structures such as boat hulls, swimming pool panels, shower stalls, bathtubs, storage tanks, sinks, and countertops. In the automotive industry, composite materials are used for interior trim components, structural components, underbody components, and closure parts. Composite materials are also used for components on spacecraft and aircraft.

Components made of composite materials are manufactured from fiber preforms constructed from yarns or fiber tows and formed into three-dimensional (3D) shapes. The fiber preforms are typically made using a 3D weaving process, a 3D braiding process, or a 3D lay of short fibers. One or more fiber performs are inserted into a mold, a resin is applied to the fiber preform(s), and the fiber preform(s) and the resin are molded into a composite component.

SUMMARY

The present application discloses a method of making a preform for use in manufacturing a component made of a composite material. In a first example, the method includes stitching fibers onto a film to form a fiber bed in a two-dimensional shape, removing the film from the fiber bed, and adjusting the fiber bed into a three-dimensional shape to form the preform.

In one aspect, the method further includes determining an amount by which the fibers are deformed when the fiber bed is adjusted from the two-dimensional shape to the three-dimensional shape, and determining, based on the fiber deformation amount, at least one of an orientation of the fibers within a plane of the fiber bed, a number of the fibers per unit area of the fiber bed, a material of stitches securing the fibers to the film, a number of the stitches per unit area of the fiber bed, and a length of the fibers between a pair of adjacent ones of the stitches.

In one aspect, the method further includes determining a first area of the fiber bed in which the fiber deformation amount is greater than the fiber deformation amount in a second area of the fiber bed, and stitching the fibers onto the film such that the fiber length in the first area of the fiber bed is greater than the fiber length in the second area of the fiber bed.

In one aspect, the method further includes placing a piece of foam onto the film in the first area of the fiber bed before stitching the fibers onto the film to increase the fiber length in the first area.

In one aspect, the method further includes determining a first area of the fiber bed in which the fiber deformation amount is greater than the fiber deformation amount in a second area of the fiber bed, stitching the fibers onto the film using a first set of the stitches in the first area of the fiber bed, stitching the fibers onto the film using a second set of the stitches in the second area of the fiber bed, and melting the stitches in the first area of the fiber bed after removing the film from the fiber bed and before adjusting the fiber bed to the three-dimensional shape. The stitches in the first set are made of a first material, and the stitches in the second set are made of a second material that has a higher melting point than the first material.

In one aspect, the method further includes determining a first area of the fiber bed in which the fiber deformation amount is greater than the fiber deformation amount in a second area of the fiber bed, stitching the fibers onto the film in the second area of the fiber bed, and not stitching the fibers onto the film in the first area of the fiber bed.

In one aspect, the film is water-soluble, and the method further includes removing the film from the fiber bed by dissolving the film.

In one aspect, the film is paper, and the method further includes removing the film from the fiber bed by tearing the film.

In a second example of a method of making a preform for use in manufacturing a component made of a composite material, the method includes stitching first fibers onto a first film to form a first fiber bed in a first two-dimensional shape with a first dart, forming a lacing that extends across the first dart, and pulling the lacing to close the first dart and adjust the first fiber bed into a first three-dimensional shape.

In one aspect, the method further includes forming the lacing using the first fibers.

In one aspect, the method further includes loosening stitches securing the first fibers to the first film along edges of the first dart after forming the lacing and before pulling the lacing.

In one aspect, the method further includes removing the first film after stitching the first fibers onto the first film and before pulling the lacing.

In one aspect, the method further includes forming the first dart in the first two-dimensional shape of the first fiber bed by stitching the first fibers onto the first film in an area surrounding the first dart without stitching the first fibers onto the first film in an area of the first dart.

In one aspect, the method further includes determining a stress in the first fibers when the first fiber bed is adjusted from the first two-dimensional shape to the first three-dimensional shape, and forming the first dart in an area of the first fiber bed in which the fiber stress is greater than the fiber stress in another area of the first fiber bed.

In one aspect, the method further includes stitching second fibers onto a second film to form a second fiber bed in a second two-dimensional shape with a second dart, closing the second dart in the second fiber bed to adjust the second fiber bed to a second three-dimensional shape, and overlaying the first and second fiber beds so that (i) the second fiber bed covers the first dart in the first fiber bed and (ii) the first fiber bed covers the second dart in the second fiber bed. The first and second fiber beds form the preform.

In a third example of a method of making a preform for use in manufacturing a component made of a composite material, the method includes stitching fibers to a film to form a fiber bed having a two-dimensional shape, and adjusting the fiber bed to a three-dimensional shape to form the preform. Stitching the fibers to the film includes stitching the fibers to the film using a first number of stitches per unit area in a first area of the fiber bed, and stitching the fibers to the film using a second number of the stitches per unit area in a second area of the fiber bed. The first number is less than the second number.

In one aspect, the method further includes determining a stress in the fibers when the fiber bed is adjusted from the two-dimensional shape to the three-dimensional shape, and stitching the fibers to the film using the first and second numbers of stitches per unit area in the first and second areas of the fiber bed, respectively. The fiber stress in the first area is greater than the fiber stress in the second area.

In one aspect, the method further includes stitching a third number of the fibers per unit area to the film in the first area of the fiber bed, and stitching a fourth number of the fibers per unit area to the film in the second area of the fiber bed. The third number is less than the fourth number.

In one aspect, the method further includes removing the film after stitching the fibers to the film and before adjusting the fiber bed to the three-dimensional shape.

In one aspect, the first area of the fiber bed corresponds to a dart in the two-dimensional shape, and the method further includes loosening the stitches along edges of the dart after removing the film, and pulling those of the fibers extending across the dart to close the dart and adjust the fiber bed to the three-dimensional shape.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some fiber preforms are initially formed in a two-dimensional (2D) shape by stitching fiber tows to a stabilizing fabric to form a fiber bed, and then adjusted to a 3D shape. The stabilizing fabric serves as a base layer to which the fiber tows are stitched. The stabilizing fabric is typically a plain weave or non-woven material that cannot stretch to match the contours of a complicated part. In addition, the multitude of stitches securing the fiber tows to the material cause the force required to shear the material to be high relative to regular non-crimp fabric or woven fabrics. In turn, it is difficult to shear the material to match the contours of a target component.

To address this issue, it may be desirable to remove the stitching in an area that needs to be sheared. However, this task is difficult for an operator to perform once the preform is manufactured, as the stitches are in multiple layers of the preform. Therefore, pieces of the preform are cut out and replaced with larger, more formable patches. This leads to inefficient use of the reinforcing materials, requires the preforms to be thicker than necessary, leads to racetracking during the molding process, adds cost to the overall operation, and slows the production of preforms. Racetracking occurs when a fiber perform does not uniformly fill a mold, which results in a gap to which resin races instead of filling up the entire composite part.

A method of forming a fiber preform according to the present disclosure addresses the above issues in one or more ways. In one way, the method uses a water-soluble film, or a film that is easily torn (e.g., newsprint paper), as the base layer to which the fiber tows are stitched so that the film may be dissolved or torn away from the fiber bed after the fiber bed is formed. Removing the film improves the formability of the fiber preform, which enables adjusting the fiber preform from its 2D shape to its 3D shape without damaging the fiber preform.

In another way, the method varies one or more parameters in areas of the fiber preform that are subjected to high shear when the fiber preform is adjusted from its 2D shape to its 3D shape. In one example, the method minimizes the number of stitches used to secure the fiber tows to the base layer in the high shear areas, does not stitch the fiber tows to the base layer in the high shear areas, and/or uses meltable stitches in the high shear areas. In another example, the method reduces the number of fiber tows crossing the high shear areas, or forms darts or gaps in the high shear areas so that the fiber tows do not extend across the high shear areas.

In another example, if darts are formed in the fiber preform, the method forms lacings that extend across the darts, and the method pulls the ends of the lacings to close the darts and adjust the fiber preform from its 2D shape to its 3D shape. The lacing may be formed from the fiber tows. The fiber tows forming the lacings may be stitched to the base layer along the edges of the darts using wider stitches with less thread tension relative to stitches in other areas to enable the fiber tows to slide.

Figure 1:
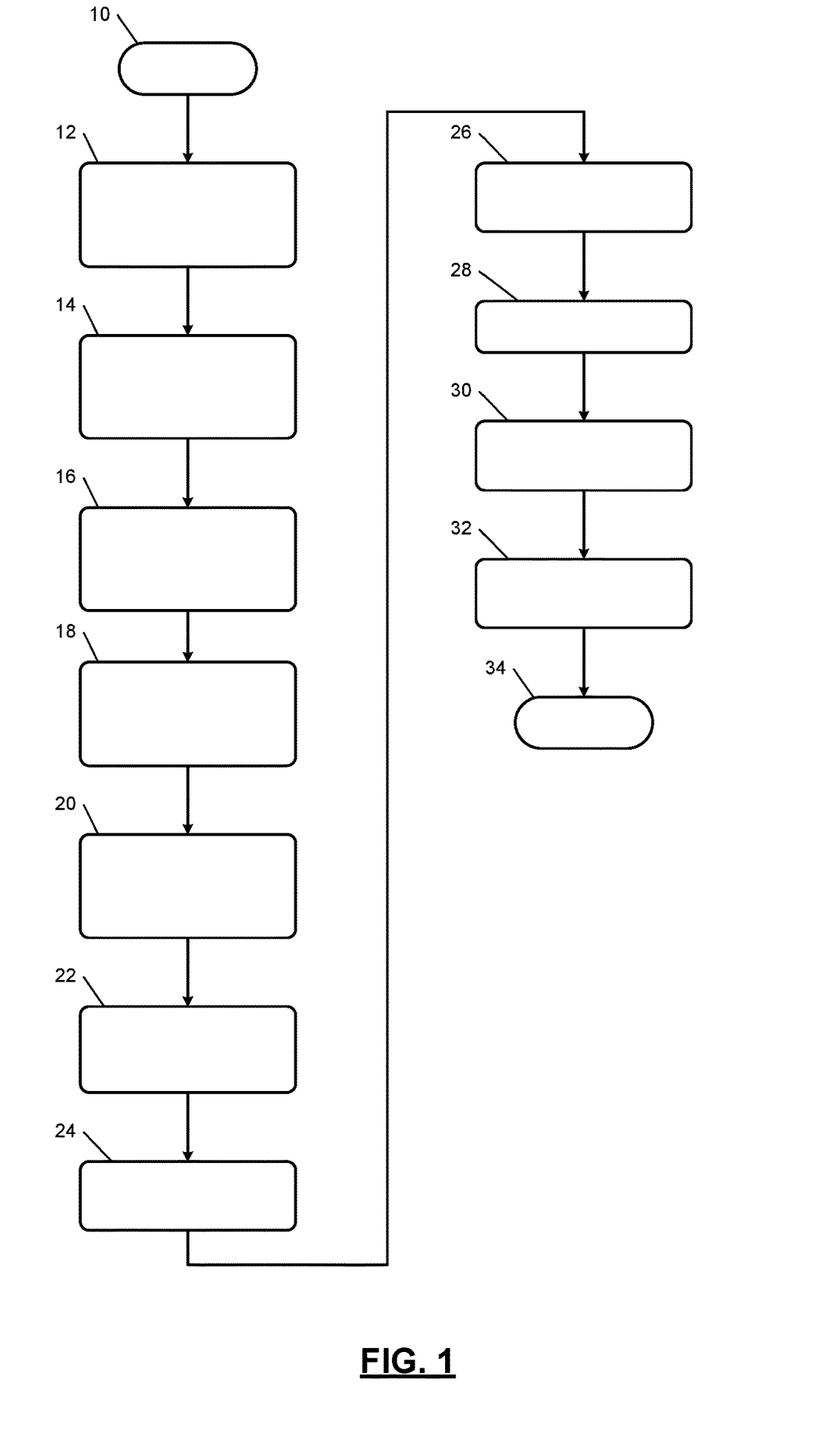
FIG. 1 is a flowchart illustrating a first example of a method for forming a fiber preform according to the principles of the present disclosure.
Figure 2:
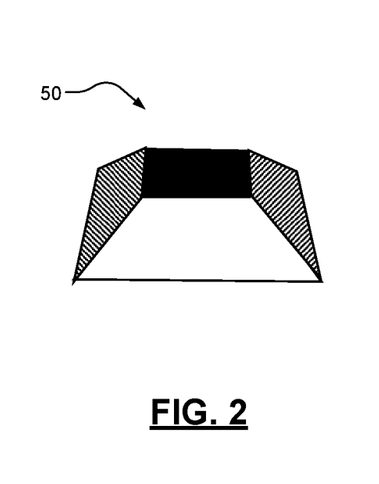
FIGS. 2 through 7 are perspective and planar views of an example of a fiber preform, or a shape thereof, at various stages of the method of FIG. 1.
Figure 3:
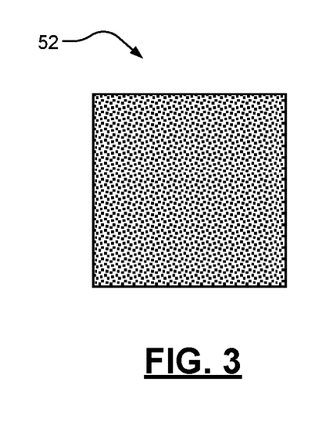
Figure 6:
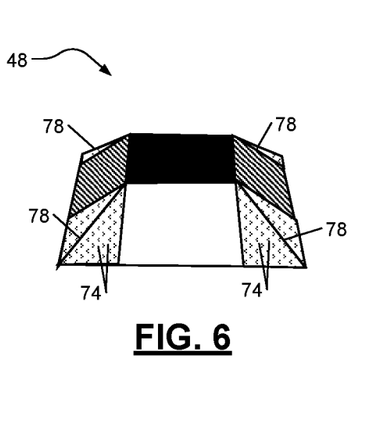

Referring now to FIG. 1, a method of forming a preform 48 shown in FIG. 6 begins at step 10. At step 12, the method analyzes the shape of the preform 48 to identify areas of high fiber deformation. For example, referring briefly to FIGS. 2 and 3, the method may determine a desired 3D shape 50 (e.g., a pyramidal frustum) of the preform 48, and determine a 2D shape 52 (e.g., square) of the preform 48 that can be adjusted (e.g., folded, molded) to the desired 3D shape 50. The method may then determine the amount of fiber deformation in the preform 48 as the preform 48 is adjusted from the 2D shape 52 to the 3D shape 50. The method may make this determination using finite element analysis (FEA).

Referring again to FIG. 1, at step 14, the method determines a desired orientation of fibers that form the preform 48 and a desired length of the fibers based on, for example, the fiber deformation as the preform 48 is adjusted from its 2D shape 52 to its 3D shape 50. For example, referring briefly to FIG. 7, to form the preform 48 in its 2D shape 52, fiber tows 54 are stitched to a backing 56, such as a stabilizing fabric or film, to form a fiber bed 58 within a plane defined by an x-axis 60 and a y-axis 62. Each fiber tow 54 includes thousands of the fibers bound together.

Figure 7:
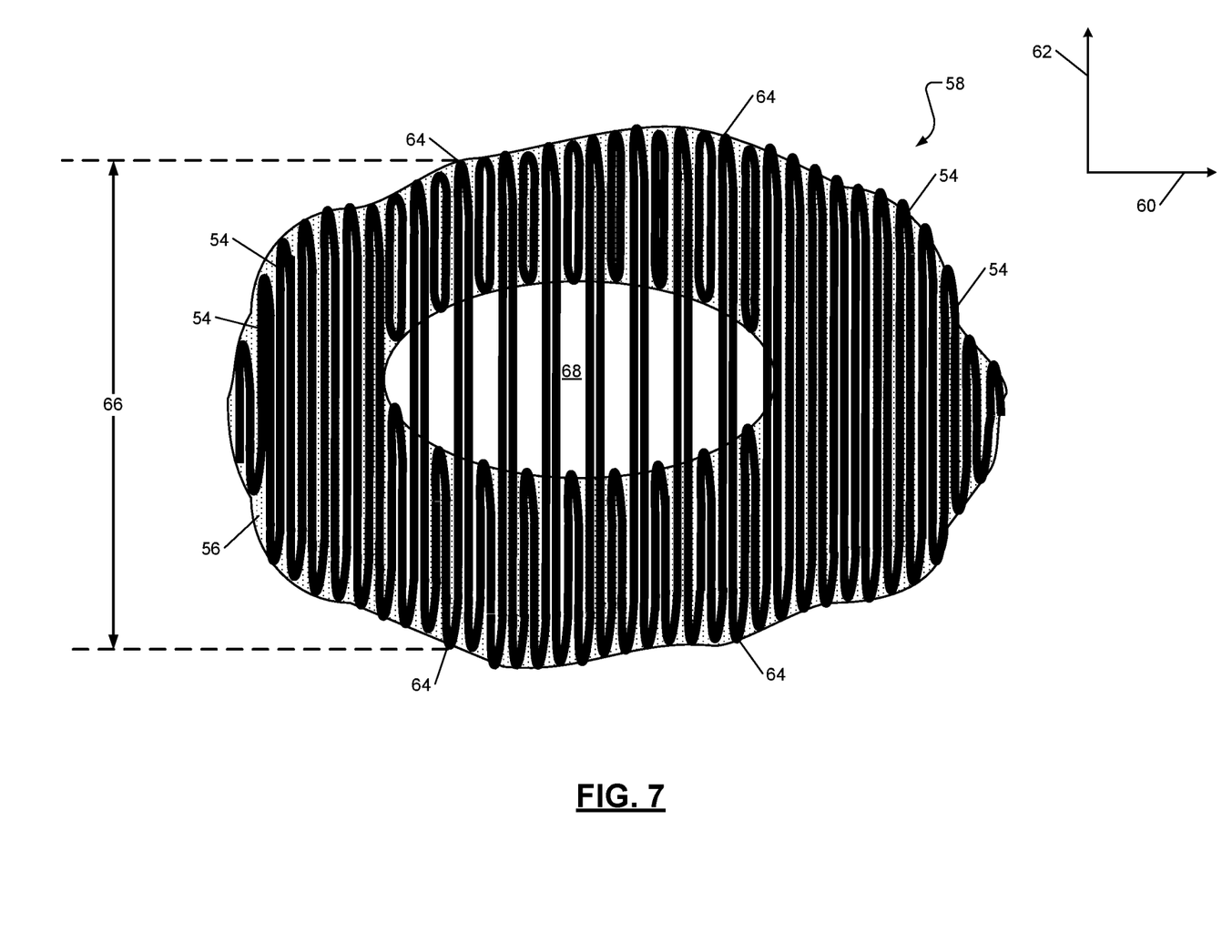

The fibers in the fiber tows 54 may be made of E-Glass, S-Glass, basalt, carbon, Kevlar®, or a combination thereof. The backing 56 may be made of a water-soluble material, such as polyvinyl alcohol, polyethylene glycol, polyvinyl alcohol acetates, polyethylene oxides, or a combination thereof, so that the backing 56 may be dissolved after the fiber bed 58 is formed. Alternatively, the backing 56 may be made of a material such as newsprint paper that is easily torn but stable enough to act as a substrate for the fiber tows 54. In turn, the backing 56 may be torn away from the fiber bed 58 after the fiber bed 58 is formed. Removing the backing 56 improves the formability of the preform 48, which enables adjusting the preform 48 from its 2D shape 52 to its 3D shape 50 without damaging the preform 48.

The method may determine the orientation of each fiber tow 54 within the plane of the fiber bed, and determining the length of each fiber tow 54 between adjacent stitches securing the fiber tow 54 to the backing 56. In the example shown, the orientation of each fiber tow 54 is generally parallel to the y-axis 60. In addition, if each fiber tow 54 is stitched to the backing 56 at locations 64 where the routing of the fiber tow 54 changes direction, then the length of each fiber tow 54 is equal to a distance 66 between the locations 64.

The method may determine the amount of fiber stress associated with multiple possible orientations of each fiber tow 54 using, for example, FEA, and select the fiber tow orientation that minimizes the fiber stress in areas of high fiber deformation. For example, if a central area 68 of the fiber bed 58 is to be confined or compressed in a depression in a tool to form the preform 48 in its 3D shape 50, the method may select the fiber orientation that minimizes the fiber stress in the central area 68. Thus, orienting the fiber tows 54 parallel to the y-axis 60 as shown may minimize the fiber stress in the central area 68 of the fiber bed 58.

Similarly, the method may determine the amount of fiber stress associated with multiple possible lengths of each fiber tow 54 using, for example, FEA, and select the fiber tow length that minimizes fiber stress in areas of high fiber deformation. If the central area 68 of the fiber bed 58 is to be compressed to form the preform 48 its 3D shape 50, the method may select the fiber tow length that minimizes the fiber stress in the central area 68. For example, the method may increase the fiber tow length in the central area 68 of the fiber bed 58 relative to the fiber tow length in other areas of the fiber bed 58 as shown, which may minimize the fiber stress in the central area 68.

Figure 4:
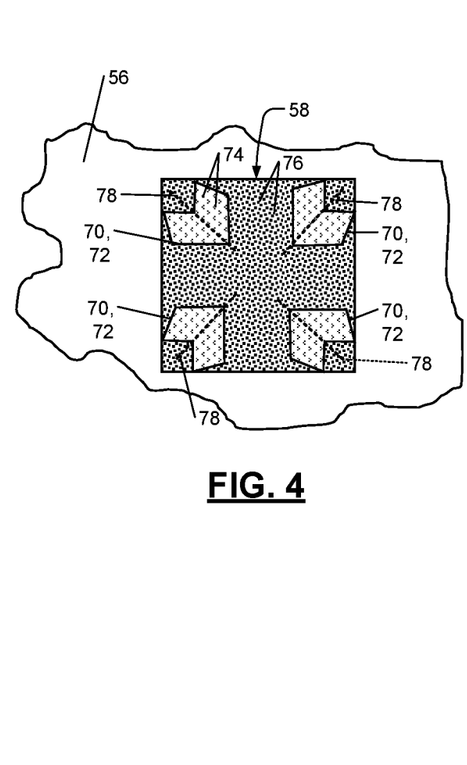

Referring now to FIGS. 1 and 4, at step 16, the method identifies high shear areas 70 in the fiber bed 58 where stitching is to be omitted or minimized. When the fiber bed 58 is adjusted from the 2D shape 52 to the 3D shape 50, the amount of fiber deformation (e.g., the amount by which the fibers are bent) is greater in the high shear areas 70 than in other areas of the fiber bed 58. The method may identify the high shear areas 70 using FEA.

At step 18, the method may place a foam insert 72 onto the backing 56 in an area of the fiber bed 58 where additional fiber tow length is desired. As discussed above, the method may use a greater fiber tow length in areas of high fiber deformation relative to the fiber tow length used in other areas of the fiber bed 58. Thus, the method may place the foam insert 72 in each of the high shear areas 70 as shown in FIG. 4 to increase the fiber tow length in the high shear areas 70. After the fiber tows 54 are stitched to the backing 56, the foam insert 72 is disposed between the fiber tows 54 and the backing 56 and therefore increases the fiber tow length in the area(s) of the fiber bed 58 in which the foam insert 72 is placed.

At step 20, the method stitches the fiber tows 54 to the backing 56 to form the fiber bed 58, and the method uses a different stitch density in the high shear areas 70 of the fiber bed 58 when doing so. For example, the method may stitch the fiber tows 54 to the backing 56 using a first number of stitches 74 per unit area in the high shear areas 70 while using a second number of stitches 76 per unit area in all other areas of the fiber bed 58. The first number is less than the second number. The first number may be zero, in which case the method does not stitch the fiber tows 54 to the backing 56 in the high shear areas 70 of the fiber bed 58.

In addition to or instead of adjusting the fiber tow length and/or the stitch density in the high shear areas 70 of the fiber bed 58, the method may adjust one or more (e.g., all) of the following in the high shear areas 70: the fiber tow orientation, the stitch material, and/or the fiber tow density. For example, in the high shear areas 70, the method may orient the fiber tows 54 perpendicular to fold lines 78 about which the fiber bed 58 is folded when the fiber bed 58 is adjusted from the 2D shape 52 to the 3D shape 50. In the remainder of the fiber bed 58, the method may orient the fiber tows 54 parallel to the vertical or horizontal edges of the fiber bed 58. In addition, the method may route the fiber tows 54 in one layer in a different direction than the fiber tows 54 in another, separate layer to accommodate part complexity.

In another example, the method may form the stitches 74 in the high shear areas 70 of the fiber bed 58 from a first material, and the method may form the stitches 76 in all other areas of the fiber bed 58 from a second material. The first material may have a lower melting point than the second material so that the stiches 74 may be melted without melting the stitches 76. The first material may be low density polyethylene, poly(ethylene adipate), poly(1-butene), poly (trans 1,4-butadiene), or a combination thereof. The second material may be polyester, polyamide 6, polyamide 66, glass, basalt, carbon or a combination thereof.

In another example, the method may stitch a third number of the fiber tows 54 per unit area to the backing 56 in the high shear areas 70, and the method may stitch a fourth number of the fiber tows 54 per unit area to the backing 56 in all other areas of the fiber bed 58. The third number is less than the fourth number. This concept is illustrated in FIG. 7, which shows fewer of the fiber tows 54 per unit area in the central area 68 of the fiber bed 58 relative to the number of the fiber tows 54 in the remainder of the fiber bed 58. Reducing the fiber tow density in the central area 68 of the fiber bed 58 allows the fiber tows 54 to be more spaced in the direction of compression before becoming closely packed. This allows the mechanical properties of the final part to be unaffected in the central area 68.

Figure 5:
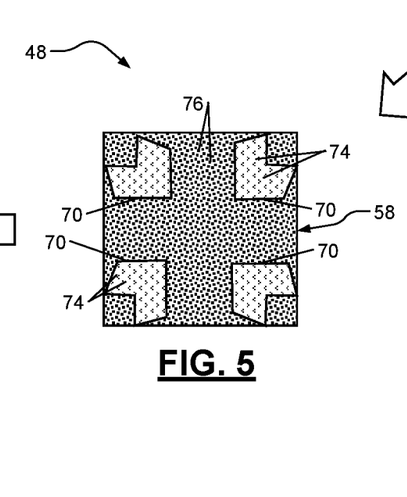

Referring now to FIGS. 1 and 5, at step 22, the method removes the backing 56 from the preform 48 and, if the foam insert 72 is placed onto the backing 56, the method removes the foam insert 72 from the preform 48. The method removes the backing 56 from the preform 48 by dissolving the backing 56 in water or tearing the backing 56 away from the fiber bed 58. At step 24, the method dries the preform 48 if the backing 56 has been removed by dissolution.

At step 26, the method melts any stitches, such as the stitches 74, in the high shear areas 70 of the fiber bed 58. At step 28, the method adds a binder to the preform 48. The binder may be made from an epoxy-based material or a urethane-based material.

At step 30, the method inserts the preform 48 into a preform mold. At step 32, the method molds the preform 48 into its final 3D shape, which is shown in FIG. 6. When the preform 48 is in its final 3D shape, the preform 48 may be inserted into a final mold and molded into a component made of composite material using, for example, high-pressure resin transfer molding (HP-RTM). Instead of adding binder to the preform 48 and inserting the preform 48 into the preform mold, the method may simply insert the preform 48 into the final mold. The method ends at step 34.

Figure 8:
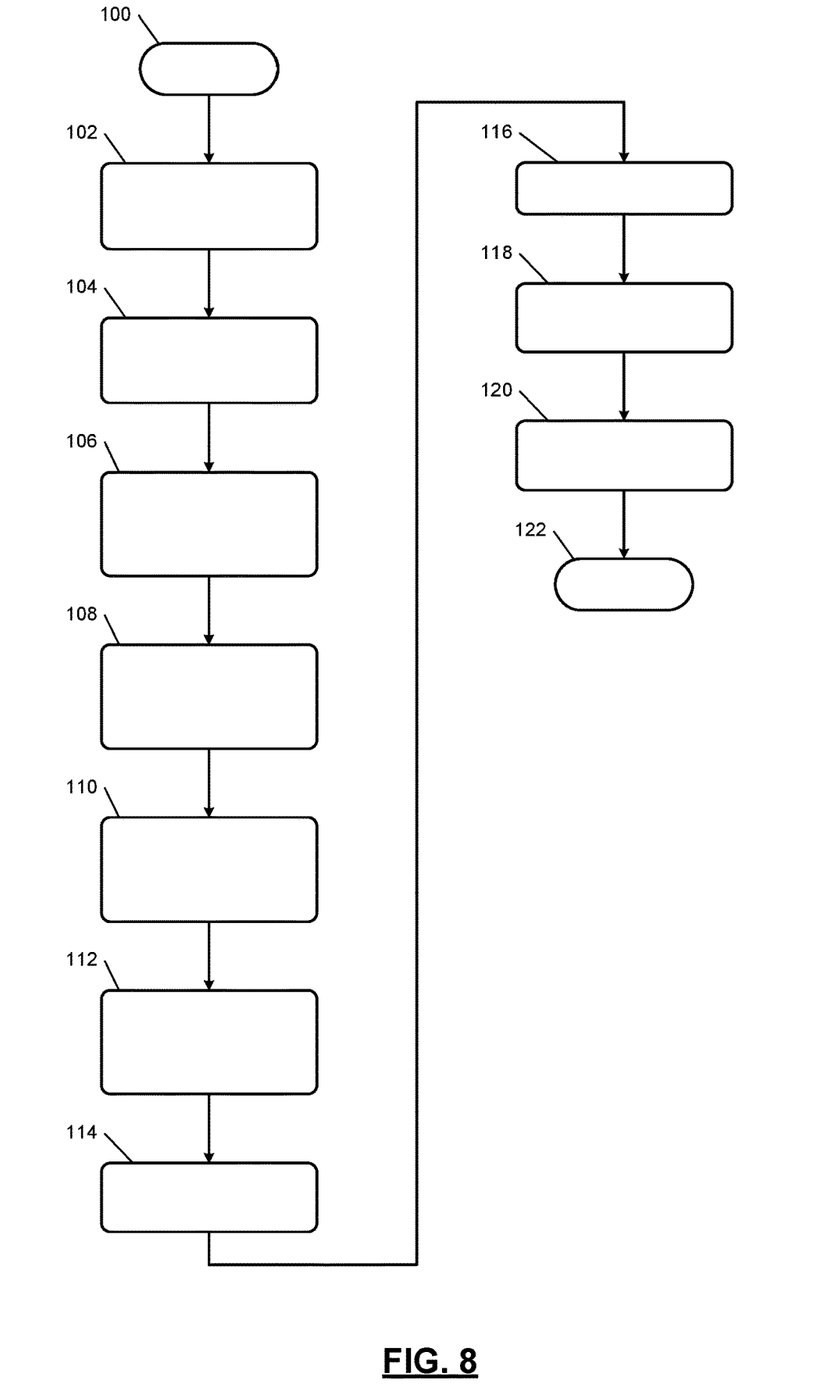
FIG. 8 is a flowchart illustrating a second example of a method for forming a fiber preform according to the principles of the present disclosure.
Figure 9:
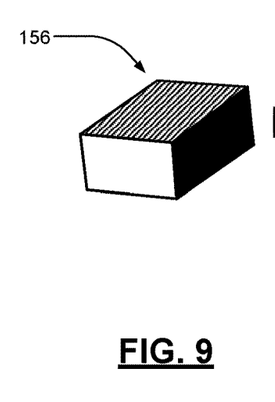
FIGS. 9 through 14 are perspective and planar views of an example of a fiber preform, or a shape thereof, at various stages of the method of FIG. 8.
Figure 14:
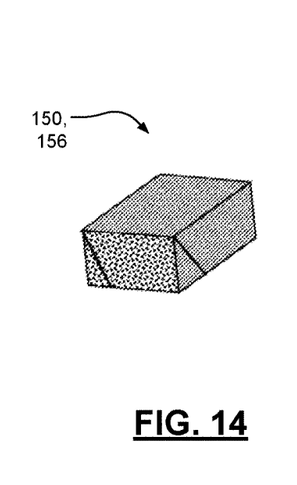

Referring now to FIG. 8, a method of forming a fiber preform 150 shown in FIG. 14 begins at step 100. At step 102, the method determines a 2D shape, such as a rectangle corresponding to a 2D shape 152 shown in FIG. 10 without darts 154, which is adjustable to a desired 3D shape 156 of the preform 150 shown in FIG. 9. For example, the method may flatten the 3D shape 156 into the 2D shape 152 using, for example, computer modeling.

Figure 10:
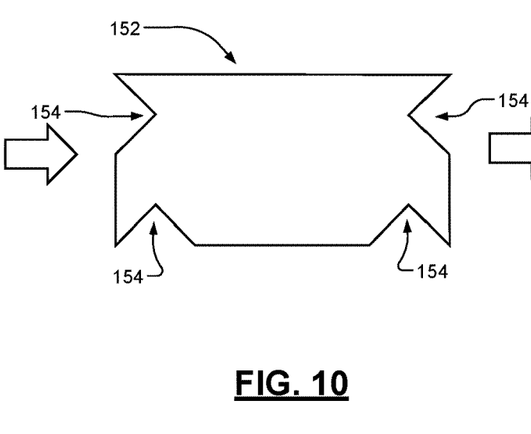

At step 104, the method analyzes the stress in the preform 150 when the preform 150 is adjusted from its 2D shape to its 3D shape 156, and removes material in areas of high stress to form the darts 154 in the 2D shape 152 as shown in FIG. 10. For example, the method may form the darts 154 in the area of the fiber bed 164 in which the fiber stress is greater than the fiber stress in other areas of the fiber bed 164. While the darts 154 have triangular shapes in the example shown, the darts 154 may have other shapes such as another polygonal shape or a shape with curved sides. The darts 154 improve the formability of the preform 150, which enables adjusting the preform 150 from its 2D shape 152 to its 3D shape 156 without damaging the preform 150.

At step 106, if multiple ones of the preform 150 are needed to cover gaps, the method may point the darts 154 in different directions. For example, referring briefly to FIG. 23, the method may point two of the darts 154 in each preform 150 in a first direction 158 and point two of the darts 154 in each preform 150 in a second direction 160 that is perpendicular to the first direction 158. In turn, when the preforms 150 overlay one another as shown in FIG. 24, the material of one of the preforms 150 covers the darts 154 in the other one of the preforms 150.

Figure 11:
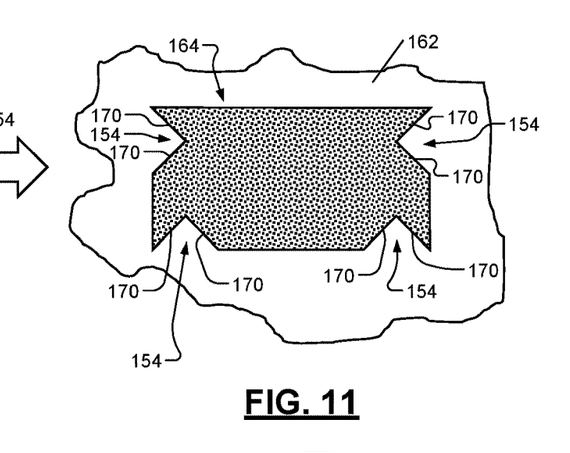

Referring now to FIGS. 8 and 11, at step 108, the method stitches fiber tows, such as the fiber tows 54 shown in FIG. 7, to a removable stabilizing film 162 to form a fiber bed 164 in the 2D shape 152. In the example shown in FIG. 11, the method places and stitches the fiber tows onto the stabilizing film 162 in areas surrounding the darts 154 without placing or stitching the fiber tows onto the stabilizing film 162 in the areas of the darts 154. Alternately, the method may place and stitch the fiber tows onto the stabilizing film 162 in the areas of the darts 154, but decrease the density of the fiber tows in the area of the darts 154 relative to the fiber tow density in the remainder of the fiber bed 164.

The stabilizing film 162 may be made of a water-soluble material, such as polyvinyl alcohol, polyethylene glycol, polyvinyl alcohol acetates, polyethylene oxides, or a combination thereof, so that the stabilizing film 162 may be dissolved after the fiber bed 164 is formed. Alternatively, the stabilizing film 162 may be made of a material such as newsprint paper that is easily torn but stable enough to act as a substrate for the fiber tows. In turn, the stabilizing film 162 may be torn away from the fiber bed 164 after the fiber bed 164 is formed. Removing the stabilizing film 162 improves the formability of the preform 150, which enables adjusting the preform 150 from its 2D shape 152 to its 3D shape 156 without damaging the preform 150.

Figure 12:
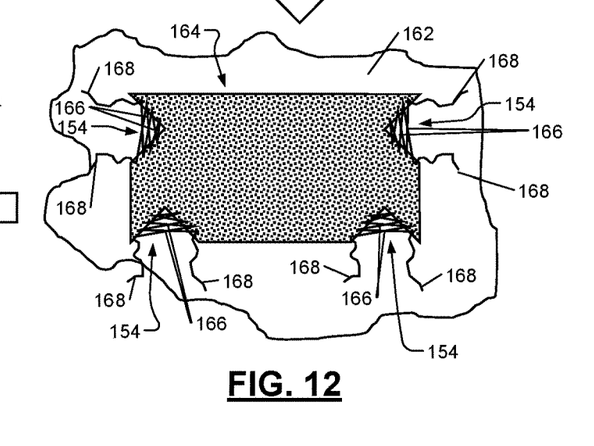

Referring now to FIGS. 8 and 12, at step 110, the method adds lacings 166 over the darts 154 using an adjusted stitch width and tension. For example, the width of stitches securing the lacings 166 to the stabilizing film 162 may be within a range from 10 percent to 50 percent greater than the width of stitches securing the fiber tows to the stabilizing film 162. In another example, the tension of the stitches securing the lacings 166 to the stabilizing film 162 may be within a range from 10 percent to 50 percent less than the tension of the stitches securing the fiber tows to the stabilizing film 162. The stitches may be formed from a stitching material such as polyester, polyamide 6, polyamide 66, glass, basalt, carbon or a combination thereof.

In the example shown in FIG. 12, the method forms the lacings 166 from the fiber tows. The method accomplishes this by extending the fiber tows across the darts 154 and stitching the fiber tows to the stabilizing film 162 at edges 170 (FIG. 11) of the darts 154 without stitching the fiber tows to the stabilizing film 162 in the areas of the darts 154. The stitching material is only used along the edges 170 of the darts 154 in order to locate fixed points through which the lacings (fiber tows) can slide. The method does not stitch the fiber tows to the stabilizing film 162 in the areas of the darts 154 since the stabilizing film 162 is to be removed, at which point only the lacings are in the dart areas as shown in FIG. 13.

Figure 13:
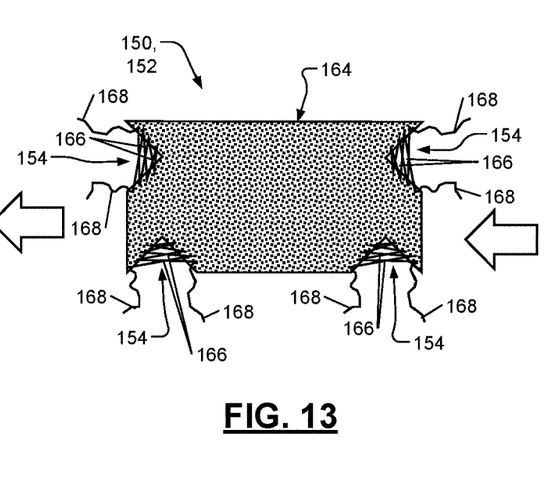

Referring now to FIGS. 8, 12, and 13, at step 112, the method removes the stabilizing film 162 from the preform 150. The method removes the stabilizing film 162 from the preform 150 by dissolving the stabilizing film 162 in water or tearing the stabilizing film 162 away from the fiber bed 164. The method dries the preform 150 if the stabilizing film 162 has been removed by dissolution.

Referring now to FIGS. 8, 13, and 14, at step 114, the method closes the darts 154 by pulling on ends 168 of the lacings 166 to draw together or overlap edges 170 (FIG. 11) of the darts 154. Pulling on the lacings 166 may also adjust the preform 150 from its 2D shape 152 shown in FIG. 13 to its 3D shape 156 shown in FIG. 14. The method may then tie the ends 168 of the lacings 166 to one another to maintain the preform 150 in its 3D shape 156. After forming the lacings 166 and before pulling the lacings 166 to close the darts 154, the method may loosen the stiches securing the lacings 166 to the fiber bed 164 along the edges 170 of the darts 154 to enable the lacings 166 to slide through the stiches.

At step 116, the method adds a binder to the preform 150. The binder may be made from an epoxy-based material or a urethane-based material. At step 118, the method inserts the preform 150 into a preform mold. At step 120, the method molds the preform 150 in its final 3D shape, which is shown in FIG. 14. When the preform 150 is in its final 3D shape, the preform 150 may be inserted into a final mold and molded into a component made of composite material using, for example, HP-RTM. Instead of adding binder to the preform 150 and inserting the preform 150 into the preform mold, the method may simply insert the preform 150 into the final mold. The method ends at step 122.

Figure 15:
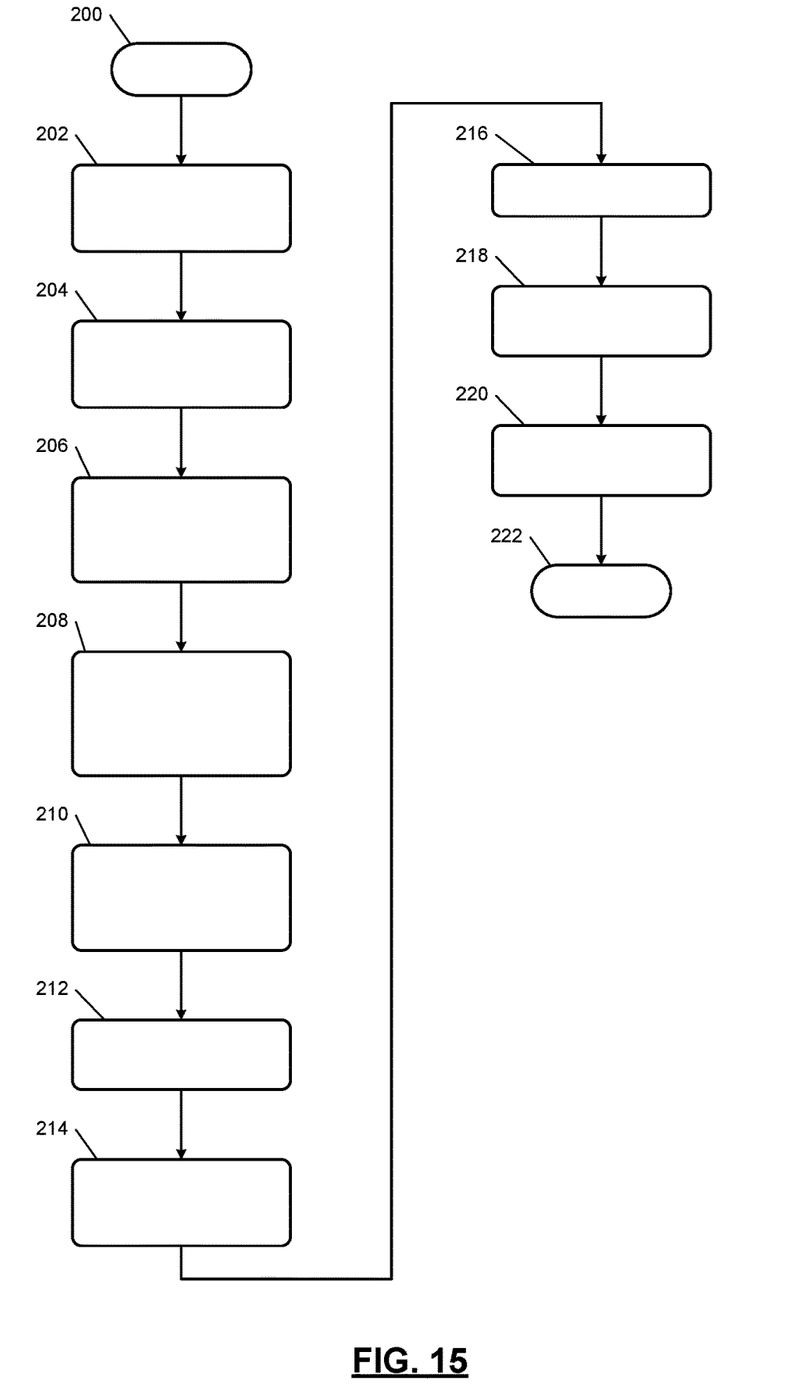
FIG. 15 is a flowchart illustrating a third example of a method for forming a fiber preform according to the principles of the present disclosure.
Figure 16:
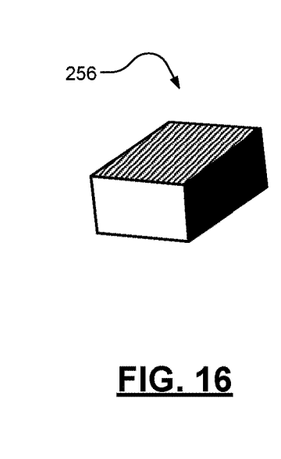
FIGS. 16 through 20 are perspective and planar views of an example of a fiber preform, or a shape thereof, at various stages of the method of FIG. 8.
Figure 20:
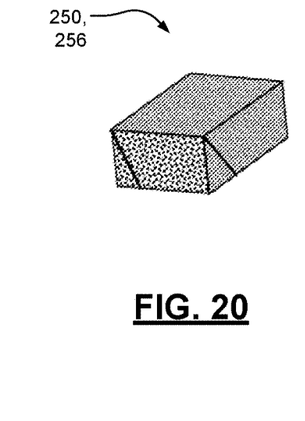

Referring now to FIG. 15, a method of forming a fiber preform 50 shown in FIG. 20 begins at step 200. At step 202, the method determines a 2D shape, such as a rectangle corresponding to a 2D shape 252 shown in FIG. 17 without darts 254, which is adjustable to a desired 3D shape 256 of the preform 250 shown in FIG. 16. The method may flatten the 3D shape 256 into the 2D shape 252 using, for example, computer modeling.

Figure 17:
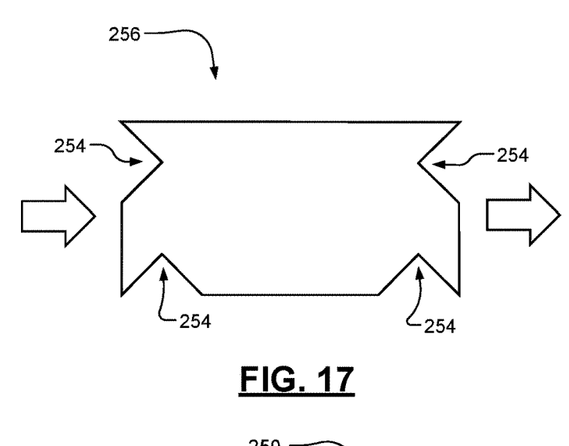

At step 204, the method analyzes the stress in the preform 250 when the preform 250 is adjusted from its 2D shape to its 3D shape 256, and removes material in areas of high stress to form the darts 254 in the 2D shape 252 as shown in FIG. 17. For example, the method may form the darts 254 in the area of the fiber bed 264 in which the fiber stress is greater than the fiber stress in other areas of the fiber bed 264. While the darts 254 have triangular shapes in the example shown, the darts 254 may have other shapes such as another polygonal shape or a shape with curved sides. The darts 254 improve the formability of the preform 250, which enables adjusting the preform 250 from its 2D shape 252 to its 3D shape 256 without damaging the preform 250.

At step 206, if multiple ones of the preform 250 are needed to cover gaps, the method may point the darts 254 in different directions. For example, briefly referring to FIG. 23, the method may point two of the darts 254 in the preform 250 in a first direction 258 and point two of the darts 254 in the preform 250 in a second direction 260 that is perpendicular the first direction 258. In turn, when the preforms 250 overlay one another as shown in FIG. 24, the material of one of the preforms 250 covers the darts 254 in the other one of the preforms 250.

Figure 18:
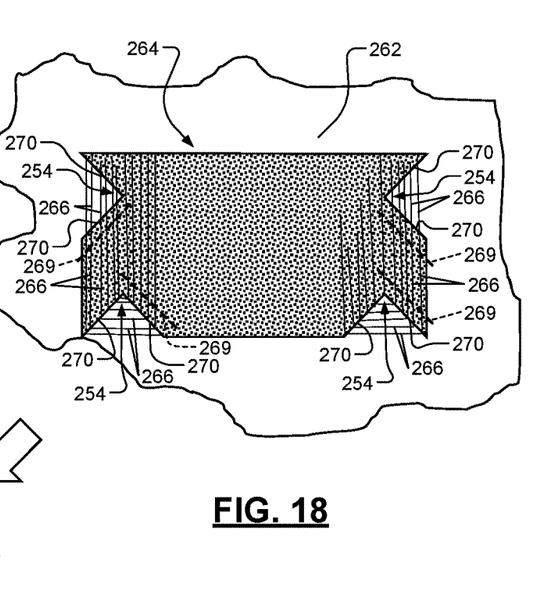

Referring now to FIGS. 15 and 18, at step 208, the method stitches fiber tows 266 to a removable stabilizing film 262 to form a fiber bed 264 in the 2D shape 252. In the example shown in FIG. 18, when stitching the fiber tows 266 to the stabilizing film 262, the method uses less stitches per unit area in the area of the darts 254 relative to the number of stitches per unit area used in the remainder of the fiber bed 264. In addition, the method uses fewer of the fiber tows 266 per unit area in the area of the darts 254 relative to the number of the fiber tows 266 per unit area used in the remainder of the fiber bed 264. Each fiber tow 266 includes thousands of fibers bound together.

The fibers in the fiber tows 266 may be made of E-Glass, S-Glass, basalt, carbon, Kevlar®, or a combination thereof. The stabilizing film 262 may be made of a water-soluble material, such as polyvinyl alcohol, polyethylene glycol, polyvinyl alcohol acetates, polyethylene oxides, or a combination thereof, so that the stabilizing film 262 may be dissolved after the fiber bed 264 is formed. Alternatively, the stabilizing film 262 may be made of a material such as newsprint paper that is easily torn but stable enough to act as a substrate for the fiber tows. In turn, the stabilizing film 262 may be torn away from the fiber bed 264 after the fiber bed 264 is formed. Removing the stabilizing film 262 improves the formability of the preform 250, which enables adjusting the preform 250 from its 2D shape 252 to its 3D shape 256 without damaging the preform 250.

Those of the fiber tows 266 that extend across the darts 254 form lacings over the darts 254. The fiber tows 266 that form the lacings are stitched to the stabilizing film 262 along edges 270 (FIG. 18) of the darts 254. The fiber tow density and the stitch density in the areas of the darts 254 may be within a range from 50 percent to 90 percent less than the fiber tow density and the stitch density, respectively, in all other areas of the fiber bed 264.

Figure 19:
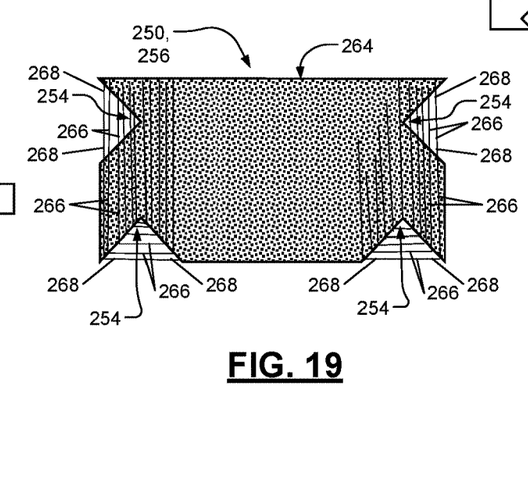

Referring now to FIGS. 15, 18, and 19, at step 210, the method removes the stabilizing film 262 from the preform 250. The method removes the stabilizing film 262 from the preform 250 by dissolving the stabilizing film 262 in water or tearing the stabilizing film 262 away from the fiber bed 264. The method dries the preform 250 if the stabilizing film 262 has been removed by dissolution. At step 212, the method loosens the stiches securing the lacings 266 to the stabilizing film 262 along the edges 270 of the darts 254 to enable the lacings 266 to slide through the stiches.

Referring now to FIGS. 15, 19, and 20, at step 214, the method closes the darts 254 by pulling on ends 268 of the lacings 266 to draw together or overlap the edges 170 of the darts 154. The ends 268 of the lacings 266 are formed by cutting the fiber tows forming the lacings 266 on one side of each dart 254 along cut lines 269 (FIG. 18). Forming the ends 268 of the lacings 266 in this way ensures that, after the stabilizing film 262 is removed, the portions of the lacings 266 adjacent to the ends 268 can slide while the portions of the lacings 266 on the other sides of the darts 254 are fixed. Pulling on the lacings 266 may also adjust the preform 250 from its 2D shape 252 shown in FIG. 13 to its 3D shape 256 shown in FIG. 14. The method may then tie the lacings 266 to one another to maintain the preform 250 in its 3D shape 256. After forming the lacings 266 and before pulling the lacings 266 to close the darts 254, the method may loosen the stiches securing the lacings 266 to the stabilizing film 262 along the edges 270 (FIG. 18) of the darts 254 to enable the lacings 266 to slide through the stiches.

At step 216, the method adds a binder to the preform 250. The binder may be made from an epoxy-based material or a urethane-based material. At step 218, the method inserts the preform 250 into a preform mold. At step 220, the method molds the preform 250 in its final 3D shape, which is shown in FIG. 20. When the preform 250 is in its final 3D shape, the preform 250 may be inserted into a final mold and molded into a component made of composite material using, for example, HP-RTM. Instead of adding binder to the preform 250 and inserting the preform 250 into the preform mold, the method may simply insert the preform 250 into the final mold. The method ends at step 222.

Figure 23:
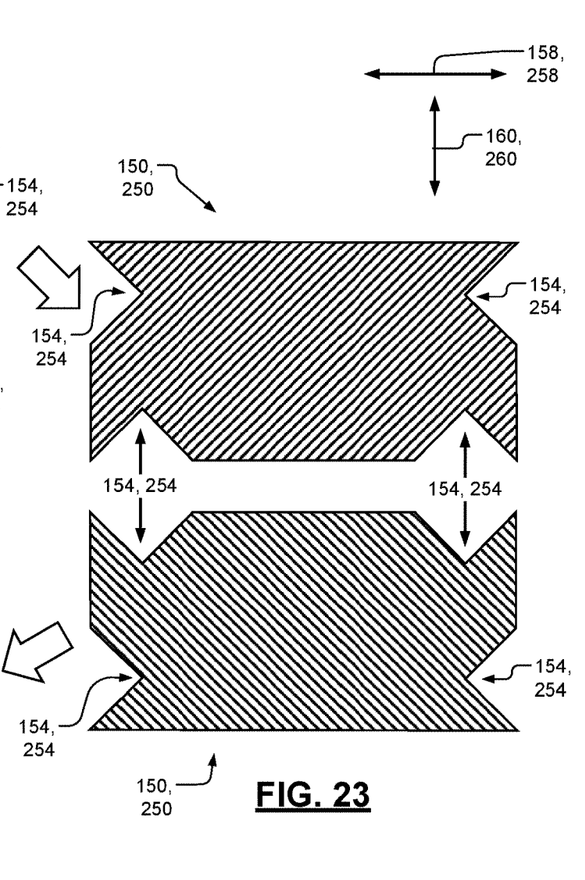
Figure 24:
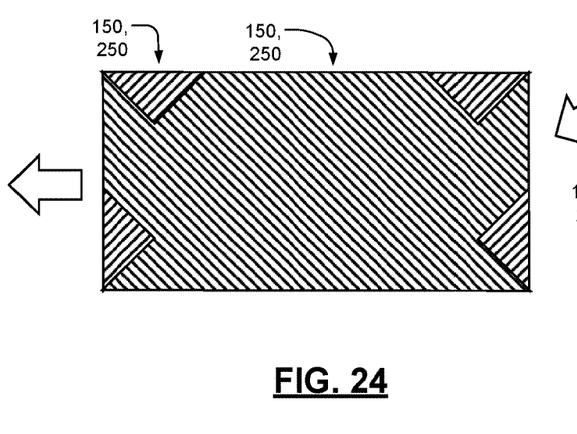
Figure 25:
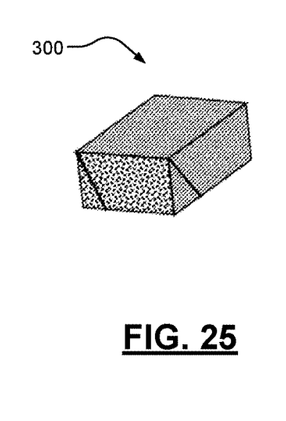

Referring now to FIGS. 21 through 25, a method of forming the fiber preform 300 shown in FIG. 25 is illustrated. The method of FIGS. 21 through 25 is illustrated using preforms that are shaped similar to the preform 150 shown in FIGS. 9 through 12 and the preform 250 shown in FIGS. 15 through 20. Therefore, the reference numbers for both of these preforms, and features thereof, are reused to describe the method of FIGS. 21 through 25.

Figure 21:
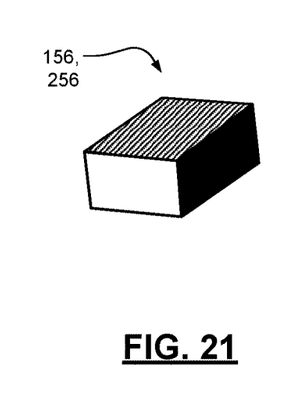
FIGS. 21 through 25 are perspective and planar views of an example of a fiber preform, or a shape thereof, at various stages of a fourth example of a method for forming a fiber preform according to the principles of the present disclosure.
Figure 22:
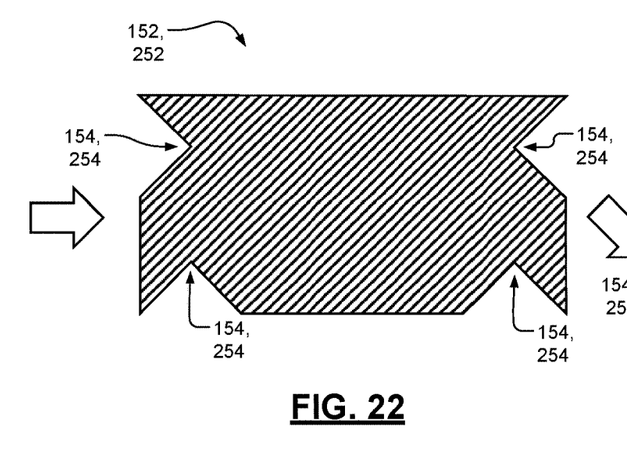

FIG. 21 shows the desired 3D shape 156 or 256 of the preform 300. FIG. 22 shows the 2D shape 152 or 252 that is adjustable to the 3D shape 156 or 256. The method may determine the 2D shape 152 or 252, and determine where and how to form the darts 154 or 254 therein, in the manner described above with reference to steps 102, 104, and 106 of FIG. 8 or to steps 202, 204, and 206 of FIG. 15. Once the 2D shape 152 or 252 is determined, the method forms the preform 150 or 250 in the manner described with reference to steps 108, 110, and 112 of FIG. 8 or to steps 208, 210, and 212 of FIG. 15.

FIG. 23 shows two of the preforms 150, two of the preforms 250, or one of the preform 150 and one of the preform 250. As discussed above, the preforms 150 and 250 have complementary patterns (e.g., the darts 154, 254 in the preforms 150 and 250 point in different directions). FIG. 24 shows two of the preforms 150 overlaying one another, two of the preforms 250 overlaying one another, the preform 150 and the preform 250 overlaying one another. Since the preforms 150 and 250 have complementary patterns, the material in one of the preforms 150 or 250 covers the gaps (e.g., the darts 154, 254) in the other one of the preforms 150 or 250 when the preforms 150 or 250 overlay one another. The method may adjust the preforms 150 or 250 to their 3D shapes 156, 256 by, for example, pulling the lacings 166 or 266, before arranging the preforms 150 to overlay one another.

FIG. 25 shows two of the preforms 150, two of the preforms 250, or the preform 150 and the preform 250 collectively forming the preform 300 in its 3D shape 156 or 256. To form the preform 300, the method may add binder to the preforms 150 or 250, insert the preforms 150 or 250 into a preform mold so that the preforms 150 or 250 overlay one another, and then mold the preforms 150 or 250 into the preform 300. The preform 300 may be inserted into a final mold and molded into a component made of composite material using, for example, HP-RTM.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of making a preform for use in manufacturing a component made of a composite material, the method comprising:
   stitching fibers onto a film to form a fiber bed in a two-dimensional shape;
   removing the film from the fiber bed; and
   adjusting the fiber bed into a three-dimensional shape to form the preform.

2. The method of claim 1 further comprising:
   determining an amount by which the fibers are deformed when the fiber bed is adjusted from the two-dimensional shape to the three-dimensional shape; and
   determining, based on the fiber deformation amount, at least one of an orientation of the fibers within a plane of the fiber bed, a number of the fibers per unit area of the fiber bed, a material of stitches securing the fibers to the film, a number of the stitches per unit area of the fiber bed, and a length of the fibers between a pair of adjacent ones of the stitches.

3. The method of claim 2 further comprising:
   determining a first area of the fiber bed in which the fiber deformation amount is greater than the fiber deformation amount in a second area of the fiber bed; and
   stitching the fibers onto the film such that the fiber length in the first area of the fiber bed greater than the fiber length in the second area of the fiber bed.

4. The method of claim 3 further comprising placing a piece of foam onto the film in the first area of the fiber bed before stitching the fibers onto the film to increase the fiber length in the first area.

5. The method of claim 2 further comprising:
   determining a first area of the fiber bed in which the fiber deformation amount is greater than the fiber deformation amount in a second area of the fiber bed;
   stitching the fibers onto the film using a first set of the stitches in the first area of the fiber bed, wherein the stitches in the first set are made of a first material;
   stitching the fibers onto the film using a second set of the stitches in the second area of the fiber bed, wherein the stitches in the second set are made of a second material that has a higher melting point than the first material; and
   melting the stitches in the first area of the fiber bed after removing the film from the fiber bed and before adjusting the fiber bed to the three-dimensional shape.

6. The method of claim 2 further comprising:
   determining a first area of the fiber bed in which the fiber deformation amount is greater than the fiber deformation amount in a second area of the fiber bed;
   stitching the fibers onto the film in the second area of the fiber bed; and
   not stitching the fibers onto the film in the first area of the fiber bed.

7. The method of claim 1 wherein the film is water-soluble, the method further comprising removing the film from the fiber bed by dissolving the film.

8. The method of claim 1 wherein the film is paper, the method further comprising removing the film from the fiber bed by tearing the film.

9. A method of making a preform for use in manufacturing a component made of a composite material, the method comprising:
   stitching first fibers onto a first film to form a first fiber bed in a first two-dimensional shape with a first dart;
   forming a lacing that extends across the first dart; and
   pulling the lacing to close the first dart and adjust the first fiber bed into a first three-dimensional shape.

10. The method of claim 9 further comprising forming the lacing using the first fibers.

11. The method of claim 10 further comprising loosening stitches securing the first fibers to the first film along edges of the first dart after forming the lacing and before pulling the lacing.

12. The method of claim 9 further comprising removing the first film after stitching the first fibers onto the first film and before pulling the lacing.

13. The method of claim 9 further comprising forming the first dart in the first two-dimensional shape of the first fiber bed by stitching the first fibers onto the first film in an area surrounding the first dart without stitching the first fibers onto the first film in an area of the first dart.

14. The method of claim 9 further comprising:

determining a stress in the first fibers when the first fiber bed is adjusted from the first two-dimensional shape to the first three-dimensional shape; and forming the first dart in an area of the first fiber bed in which the fiber stress is greater than the fiber stress in another area of the first fiber bed.

15. The method of claim 9 further comprising:

stitching second fibers onto a second film to form a second fiber bed in a second two-dimensional shape with a second dart;

closing the second dart in the second fiber bed to adjust the second fiber bed to a second three-dimensional shape; and overlaying the first and second fiber beds so that (i) the second fiber bed covers the first dart in the first fiber bed and (ii) the first fiber bed covers the second dart in the second fiber bed, wherein the first and second fiber beds form the preform.

16. A method of making a preform for use in manufacturing a component made of a composite material, the method comprising:

stitching fibers to a film to form a fiber bed having a two-dimensional shape, wherein stitching the fibers to the film includes:

stitching the fibers to the film using a first number of stitches per unit area in a first area of the fiber bed; and stitching the fibers to the film using a second number of the stitches per unit area in a second area of the fiber bed, wherein the first number is less than the second number; and adjusting the fiber bed to a three-dimensional shape to form the preform.

17. The method of claim 16 further comprising:

determining a stress in the fibers when the fiber bed is adjusted from the two-dimensional shape to the three-dimensional shape; and stitching the fibers to the film using the first and second numbers of stitches per unit area in the first and second areas of the fiber bed, respectively, when the fiber stress in the first area is greater than the fiber stress in the second area.

18. The method of claim 16 further comprising:

stitching a third number of the fibers per unit area to the film in the first area of the fiber bed; and stitching a fourth number of the fibers per unit area to the film in the second area of the fiber bed, wherein the third number is less than the fourth number.

19. The method of claim 16 further comprising removing the film after stitching the fibers to the film and before adjusting the fiber bed to the three-dimensional shape.

20. The method of claim 16 wherein the first area of the fiber bed corresponds to a dart in the two-dimensional shape, the method further comprising:

loosening the stitches along edges of the dart after removing the film; and pulling those of the fibers extending across the dart to close the dart and adjust the fiber bed to the three-dimensional shape.

* * * * *